United States Patent
Jiang et al.

(10) Patent No.: US 9,218,078 B2
(45) Date of Patent: Dec. 22, 2015

(54) TOUCH PANEL AND MANUFACTURING METHOD THEREOF

(71) Applicant: TPK Touch Solutions (Xiamen) Inc., Xiamen (CN)

(72) Inventors: Yau-Chen Jiang, Hsinchu (TW); Defa Wu, Jinjiang (CN); Jianbin Yan, Putian (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 84 days.

(21) Appl. No.: 14/069,395

(22) Filed: Nov. 1, 2013

(65) Prior Publication Data
US 2014/0125882 A1    May 8, 2014

(30) Foreign Application Priority Data
Nov. 2, 2012    (CN) .......................... 2012 1 0435189

(51) Int. Cl.
G06F 3/041      (2006.01)
G06F 3/044      (2006.01)

(52) U.S. Cl.
CPC ............... *G06F 3/041* (2013.01); *G06F 3/044* (2013.01); *G06F 2203/04111* (2013.01); *Y10T 29/49105* (2015.01)

(58) Field of Classification Search
None
See application file for complete search history.

(56) References Cited

U.S. PATENT DOCUMENTS

2010/0053103 A1*   3/2010   No et al. .................... 345/173
2011/0109532 A1*   5/2011   Choi ........................... 345/76

* cited by examiner

*Primary Examiner* — Kenneth B Lee, Jr.
(74) *Attorney, Agent, or Firm* — Gokalp Bayramoglu

(57) ABSTRACT

A touch panel includes an insulating layer, a first axis electrode, and a second axis electrode. The insulating layer has first holes and second holes. The first axis electrode include first upper conductive units disposed on an upper side of the insulating layer and first lower conductive units disposed on a lower side of the insulating layer. Each first hole partially exposes the corresponding first lower conductive unit. The first upper conductive units are electrically connected to the first lower conductive units via the first holes. The second axis electrode includes second upper conductive units disposed on the upper side of the insulating layer and second lower conductive units disposed on the lower side of the insulating layer. Each the second holes partially exposes the corresponding second lower conductive unit. The second upper conductive units are electrically connected to the second lower conductive units via the second holes.

20 Claims, 5 Drawing Sheets

TOUCH PANEL AND MANUFACTURING METHOD THEREOF

BACKGROUND OF THE INVENTION

This Application claims priority of the People's Republic of China Patent Application No. 201210429498.4, filed on Oct. 30, 2012, the entirety of which is incorporated by reference herein.

1. Field of the Invention

The present invention relates to an input interface and a manufacturing method of the input interface, and more particularly, to a touch panel and a manufacturing method of the touch panel.

2. Description of the Prior Art

Touch panels have been applied in many consumer electronics recently. There are many diverse technologies of touch panel, and the resistance touch technology and the capacitive touch technology are the main touch technologies in portable electronic devices. In these touch technologies, sensing electrodes are used to detect variations of electrical voltage and electrical current around touch points, and connecting lines connected to the sensing electrodes along different axes are used to transmit signals for positioning the touch points.

In a conventional capacitive touch panel, a plurality of insulating blocks are disposed in crossing regions of sensing electrodes in different axes so as to electrically isolate sensing electrodes of different sensing axes and prevent signal interfering issues. Please refer to FIG. 1. FIG. 1 is a schematic diagram illustrating a conventional touch panel. As shown in FIG. 1, a conventional touch panel 100 includes a first axis electrode 140X extending along a first direction X, a second axis electrode 140Y extending along a second direction Y, and an insulating block 120. The first axis electrode 140X includes a plurality of first electrode pads 130X and a bridge line 110. The bridge line 110 is used to electrically connect two of the first electrode pads 130X disposed adjacently to each other. The second axis electrode 140Y includes a plurality of second electrode pads 130Y connected with each other. The insulating block 120 is disposed between the second axis electrode 140Y and the bridge line 110, and the block 120 is used to electrically isolate the second axis electrode 140Y from the bridge line 110. The second axis electrode 140Y or the bridge line 110 may be disposed on the insulating block 120. The second axis electrode 140Y or the bridge line 110 on the insulating block 120 may have a breaking concern because of a contour condition influenced by the insulating block 120, and a signal stability of the touch panel 100 may be influenced accordingly, especially when a thickness of the bridge line 110 gets thinner according to other design considerations.

SUMMARY OF THE INVENTION

One of the objectives of the present invention is to provide a touch panel and a manufacturing method of the touch panel. Conductive units are disposed on an upper side and a lower side of an insulating layer. The conductive units disposed on different sides are electrically connected with each other via holes formed in an insulating layer. Different axis electrodes extending in different directions and electrically isolated from each other may be formed accordingly. Because the conventional bridge design is not applied in the touch panel of the present invention, related yield problems caused by the bridge design may be prevented, and the product quality and the reliability may be enhanced accordingly.

To achieve the purposes described above, a preferred embodiment of the present invention provides a touch panel. The touch panel includes an insulating layer, a first axis electrode, and a second axis electrode. The insulating layer has a plurality of first holes and a plurality of second holes. The first axis electrode extends along a first direction, and the first axis electrode includes a plurality of first upper conductive units and a plurality of first lower conductive units. The first upper conductive units are disposed on an upper side of the insulating layer, and the first lower conductive units are disposed on a lower side of the insulating layer. Each of the first holes partially exposes one of the first lower conductive units, and the first upper conductive units are electrically connected to the first lower conductive units via the first holes. The second axis electrode extends along a second direction, and the second axis electrode includes a plurality of second upper conductive units and a plurality of second lower conductive units. The second upper conductive units are disposed on the upper side of the insulating layer, and the second lower conductive units are disposed on the lower side of the insulating layer. Each of the second holes partially exposes one of the second lower conductive units, and the second upper conductive units are electrically connected to the second lower conductive units via the second holes. Each second axis electrode is electrically isolated from each first axis electrode.

Another preferred embodiment of the present invention provides a manufacturing method of a touch panel. The manufacturing method includes following steps. Firstly, a plurality of first lower conductive units and a plurality of second lower conductive units are formed on a substrate. An insulating layer is then formed and covers the first lower conductive units and the second lower conductive units. A plurality of first holes and a plurality of second holes are formed in the insulating layer. Each of the first holes partially exposes one of the first lower conductive units, and each of the second holes partially exposes one of the second lower conductive units. A plurality of first upper conductive units and a plurality of second upper conductive units are then formed on the insulating layer. The first upper conductive units are electrically connected to the first lower conductive units via, the first holes, and the second upper conductive units are electrically connected to the second lower conductive units via the second holes.

In the touch panel of the present invention, the conductive units are disposed on the upper side and the lower side of the insulating layer. The conductive units disposed on different sides are electrically connected with each other via the holes formed in the insulating layer. Different axis electrodes extending in different directions and electrically isolated from each other may be formed accordingly. Since the conventional bridge design is not required in the touch panel of the present invention, related yield problems caused by the bridge design may be prevented, and the product quality and the reliability may be enhanced accordingly.

These and other objectives of the present invention will no doubt become obvious to those of ordinary skill in the art after reading the following detailed description of the preferred embodiment that is illustrated in the various figures and drawings.

DETAILED DESCRIPTION OF THE EMBODIMENTS

Figure 1:
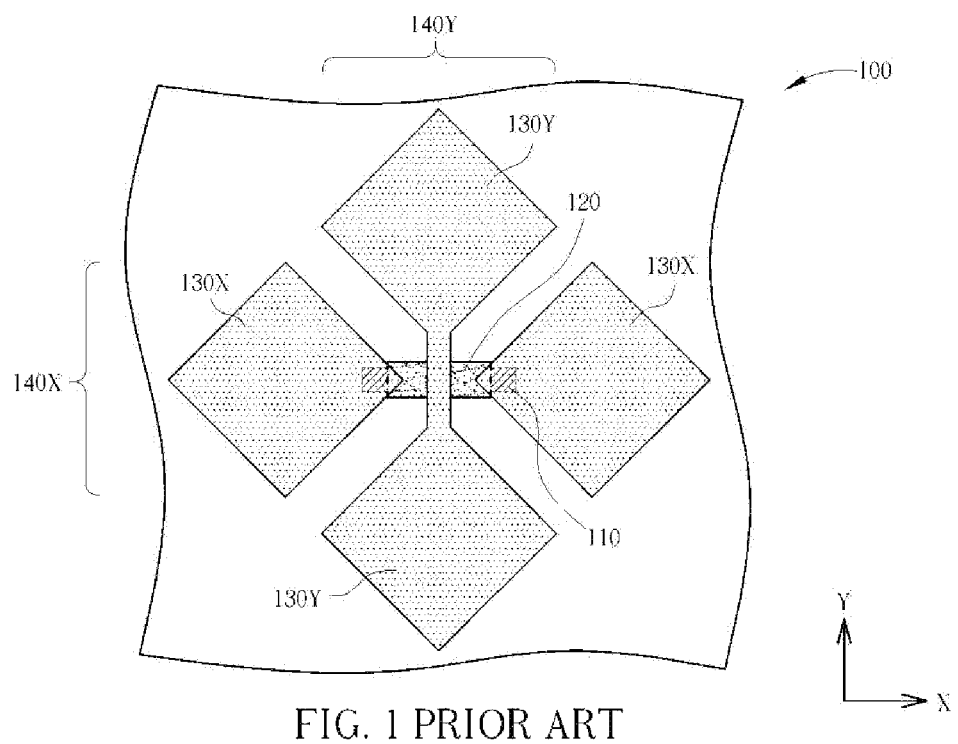
FIG. 1 is a schematic diagram illustrating a conventional touch panel.

Certain terms are used throughout the description and following claims to refer to the particular components. As one skilled in the art will understand, electronic equipment manufacturers may refer to a component by different names. This document does not intend to distinguish the components that differ in name but not function. In the following description and in the claims, the terms "include" and "comprise" are used in an open-ended fashion, and thus should be interpreted to mean "include, but not limited to . . . . " In addition, to simplify the descriptions and make it more convenient to compare each embodiment, identical components are marked with the same reference numerals in each of the following embodiments. Please note that the figures are only for illustration and the figures may not be to scale. Additionally, the terms such as "first" and "second" in this context are only used to distinguish different components and do not constrain the order of generation.

Figure 2:
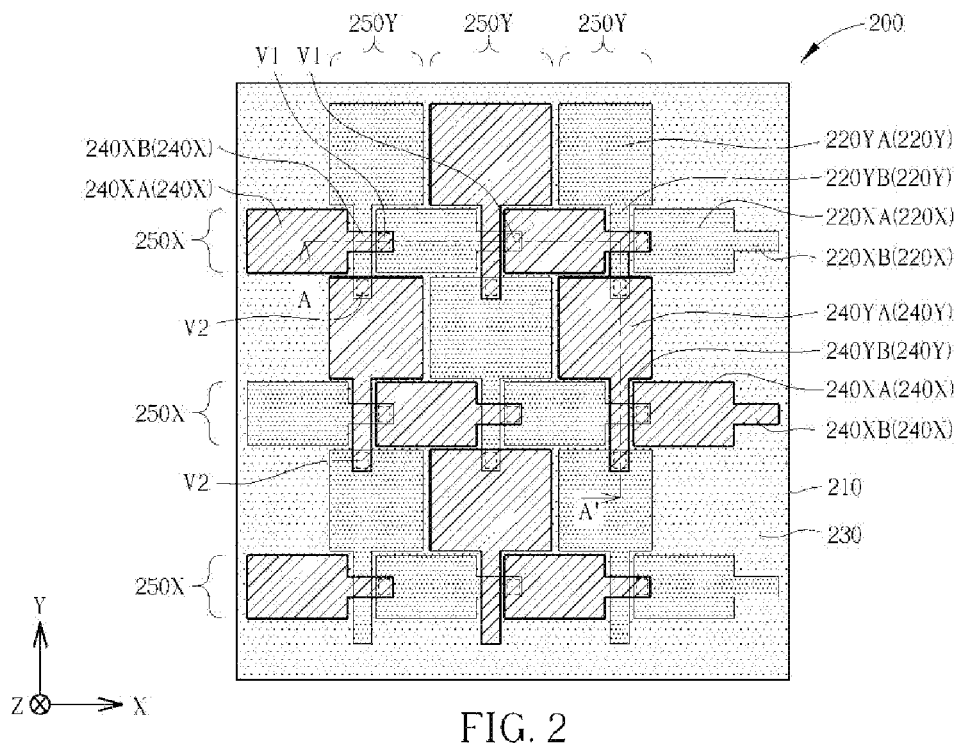
FIG. 2 is a schematic diagram illustrating a touch panel according to a first preferred embodiment of the present invention.
Figure 3:
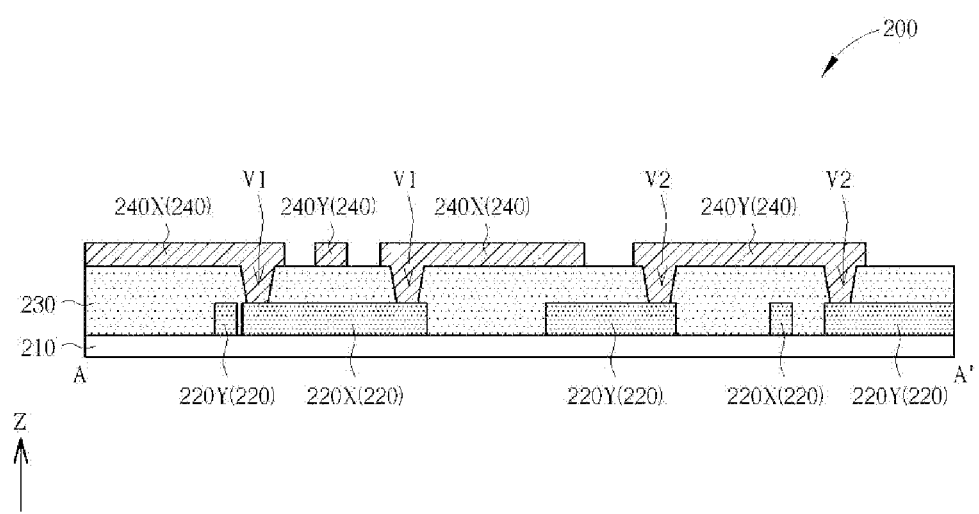
FIG. 3 is a cross-sectional view diagram taken along a cross-sectional line A-A' in FIG. 2.

Please refer to FIG. 2 and FIG. 3. FIG. 2 is a schematic diagram illustrating a touch panel according to a first preferred embodiment of the present invention. FIG. 3 is a cross-sectional view diagram taken along a cross-sectional line A-A' in FIG. 2. Please note that the figures are only for illustration and the figures may not be to scale. The scale may be further modified according to different design considerations. As shown in FIG. 2 and FIG. 3, a touch panel 200 is provided in this embodiment. The touch panel 200 includes an insulating layer 230, a first axis electrode 250X, and a second axis electrode 250Y. The insulating layer 230 has a plurality of first holes V1 and a plurality of second holes V2. More specifically, the touch panel 200 in this embodiment includes a plurality of first axis electrodes 250X and a plurality of second axis electrodes 250Y. The first axis electrodes 250X are electrically isolated from the second axis electrodes 250Y. The first axis electrodes 250X extend along a first direction X, and the second axis electrodes 250Y extend along a second direction Y. The first direction X is preferably perpendicular to the second direction Y, but not limited thereto. Each of the first axis electrodes 250X includes a plurality of first upper conductive units 240X and a plurality of first lower conductive units 220X. The first upper conductive units 240X are disposed on an upper side of the insulating layer 230, and the first lower conductive units 220X are disposed on a lower side of the insulating layer 230. Each of the second axis electrodes 250Y includes a plurality of second upper conductive units 240Y and a plurality of second lower conductive units 220Y. The second upper conductive units 240Y are disposed on the upper side of the insulating layer 230, and the second lower conductive units 220Y are disposed on the lower side of the insulating layer 230. In other words, each of the first upper conductive units 240X and each of the second upper conductive units 240Y are disposed on the upper side of the insulating layer 230. Each of the first lower conductive units 220X and each of the second lower conductive units 220Y are disposed on the lower side of the insulating layer 230. Each of the first holes V1 partially exposes one of the first lower conductive units 220X, and the first upper conductive units 240X are electrically connected to the first lower conductive units 220X via the first holes V1. Each of the second holes V2 partially exposes one of the second lower conductive units 220Y, and the second upper conductive units 240Y are electrically connected to the second lower conductive units 220Y via the second holes V2.

In the touch panel 200 of this embodiment, the first upper conductive units 240X and the first lower conductive units 220X are disposed alternately on the upper side and the lower side of the insulating layer 230 along the first direction X, and the second upper conductive units 240Y and the second lower conductive units 220Y are disposed alternately on the upper side and the lower side of the insulating layer 230 along the second direction Y. In other words, each of the first axis electrodes 250X is composed of the first upper conductive units 240X and the first lower conductive units 220X disposed alternately along the first direction X and directly connected with each other via the first holes V1. Each of the second axis electrodes 250Y is composed of the second upper conductive units 240Y and the second lower conductive units 220Y disposed alternately along the second direction Y and directly connected with each other via the second holes V2. Accordingly, no bridge structure is required for electrical connection in the first axis electrodes 250X and the second axis electrodes 250Y which are used for touch sensing in the touch panel 200. Related yield problems caused by the bridge design may be prevented, and the product quality and the reliability may be enhanced accordingly. It is worth noting that a range of face to face between the first upper conductive units 240X and the second upper conductive units 240Y and a range of face to face between the first lower conductive units 220X and the second lower conductive units 220Y may become larger without the conventional bridge structures in touch panels, wherein the shape of conductive unit is preferably showed in FIG. 2, for example, but not limited thereto. An electrical capacitance effect between the first upper conductive unit 240X and the second upper conductive unit 240Y disposed adjacently to each other, and an electrical capacitance effect between the first lower conductive unit 220X and the second lower conductive unit 220Y disposed adjacently to each other may be enhanced accordingly. Touch precision and touch accuracy in touch sensing of the touch panel 200 may also be enhanced. Additionally, a size of a conventional bridge structure in a touch panel is relatively small for appearance considerations, and a resistance of the conventional bridge structure is generally too high to cause electrostatic discharge issues. In the touch panel 200 of this embodiment, two of the first upper conductive units 240X disposed adjacently to each other are electrically connected to each other via the first lower conductive unit 220X directly, and two of the second upper conductive units 240Y disposed adjacently to each other are electrically connected to each other via the second lower conductive unit 220Y directly. Resistances of the first axis electrode 250X and the second axis electrode 250Y may be lowered and an ability of electrostatic discharge protection in the touch panel 200 may be enhanced too.

In this embodiment, the first lower conductive units 220X and the second lower conductive units 220Y may preferably include an identical conductive material, and the first upper conductive units 240X and the second upper conductive units 240Y may preferably include an identical conductive material, but not limited thereto. The conductive material mentioned above may include a transparent conductive material such as indium tin oxide (ITO), indium zinc oxide (IZO), and aluminum zinc oxide (AZO), or other appropriate non-transparent conductive materials such as silver (Ag), aluminum (Al), copper (Cu), magnesium (Mg), molybdenum (Mo), a stack layer of the above-mentioned materials, or an alloy of the above-mentioned materials, but not limited thereto. In addition, the first lower conductive units 220X are electrically isolated from the second lower conductive units 220Y, and the first upper conductive units 240X are electrically isolated from the second upper conductive units 240Y. It is worth noting that, as shown in FIG. 2 and FIG. 3, the touch panel 200 in this embodiment may further include a substrate 210 disposed on the lower side of the insulating layer 230. The first lower conductive 220X units and the second lower conductive units 220Y are disposed between the insulating layer 230 and the substrate 210, but not limited thereto. Additionally, the insulating layer 230 may include inorganic materials such as silicon nitride, silicon oxide, and silicon oxynitride, organic materials such as acrylic resin and polyimide, or other appropriate materials. It is worth noting that the insulating layer 230 in this embodiment is preferably one insulating layer covering the substrate 210, the first lower conductive units 220X, and the second lower conductive units 220Y, and the first holes V1 and the second holes V2 in the insulating layer 230 are used to partially expose the first lower conductive units 220X and the second lower conductive units 220Y respectively, but not limited thereto.

It is worth noting that, in this embodiment, each of the first upper conductive units 240X may preferably include a first upper main part 240XA and a first upper protrudent part 240XB. The first upper protrudent part 240XB extends from the first upper main part 240XA along the first direction X. Each of the first lower conductive units 220X may preferably include a first lower main part 220XA and a first lower protrudent part 220XB. The first lower protrudent part 220XB extends from the first lower main part 220XA along the first direction X. Each of the first upper protrudent parts 240XB is electrically connected to one of the first lower main parts 220XA via one of the first holes V1, and each of the first lower protrudent parts 220XB is electrically connected to one of the first upper main parts 240XA via one of the first holes V1. Similarly, each of the second upper conductive units 240Y may preferably include a second upper main part 240YA and a second upper protrudent part 240YB. The second upper protrudent part 240YB extends from the second upper main part 240YA along the second direction Y. Each of the second lower conductive units 220Y may preferably include a second lower main part 220YA and a second lower protrudent part 220YB. The second lower protrudent part 220YB extends from the second lower main part 220YA along the second direction Y. Each of the second upper protrudent parts 240YB is electrically connected to one of the second lower main parts 220YA via one of the second holes V2, and each of the second lower protrudent parts 220YB is electrically connected to one of the second upper main parts 240YA via one of the second holes V2. Specifically, each of the first upper main parts 240XA, each of the second upper main parts 240YA, each of the first lower main parts 220XA, and each of the second lower main parts 220YA are preferably separated from each other and do not overlap with each other along a third direction Z perpendicular to the substrate 210. In this embodiment, each of the first upper main parts 240XA, each of the second upper main parts 240YA, each of the first lower main parts 220XA, and each of the second lower main parts 220YA are preferably rectangular shapes, but not limited thereto. In other preferred embodiments of the present invention, each of the first upper main parts 240XA, each of the second upper main parts 240YA, each of the first lower main parts 220XA, and each of the second lower main parts 220YA may also be designed in other shapes such as triangles, polygons, or irregular shapes so as to generate other required effects.

Figure 4:
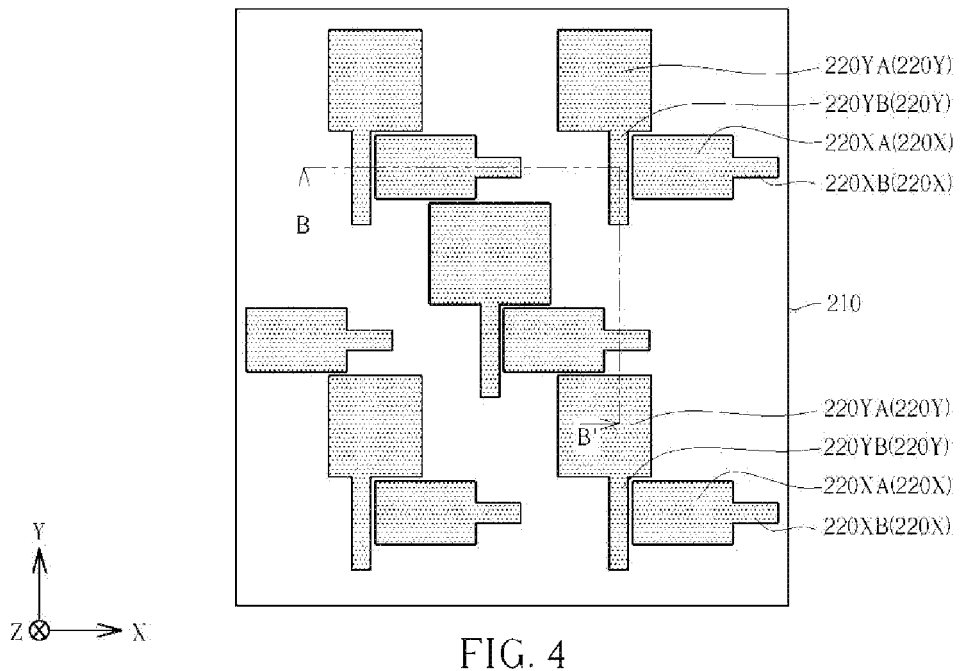
FIGS. 4-7 are schematic diagrams illustrating a manufacturing method of a touch panel according to the first preferred embodiment of the present invention.
Figure 5:
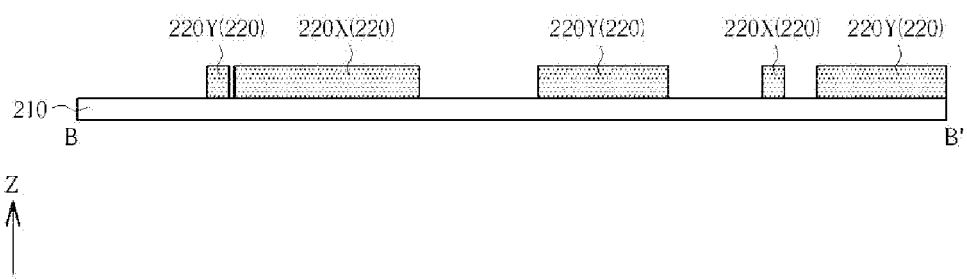
Figure 6:
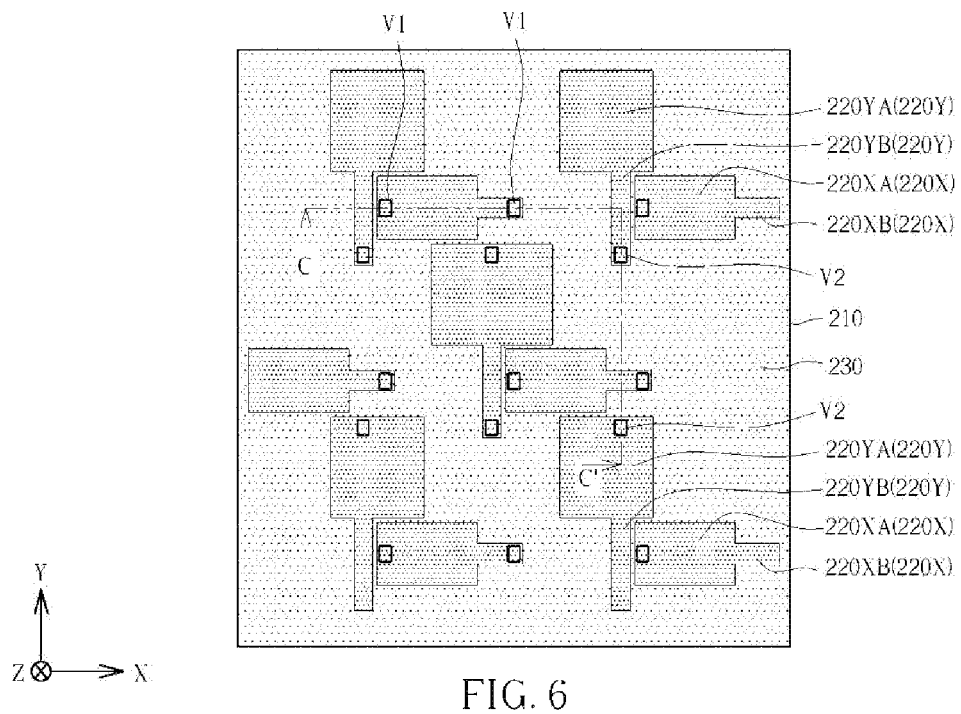
Figure 7:
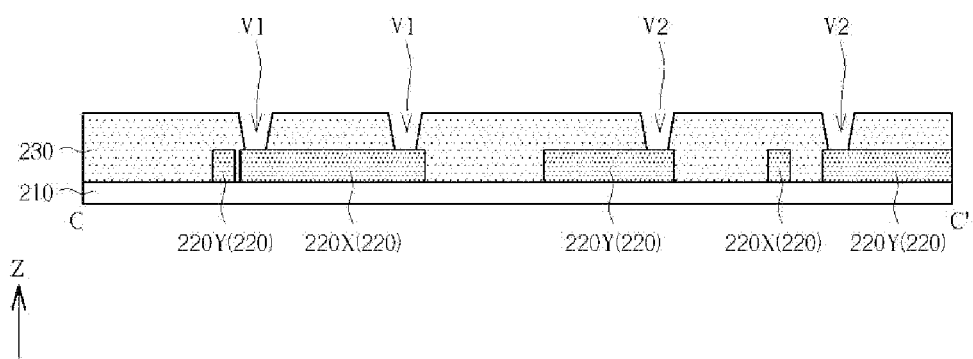

Please refer to FIGS. 4-7, and refer to FIG. 2 and FIG. 3 together. FIGS. 2-7 are schematic diagrams illustrating a manufacturing method of a touch panel according to the first preferred embodiment of the present invention. FIG. 5 is a cross-sectional view diagram taken along a cross-sectional line B-B' in FIG. 4. FIG. 7 is a cross-sectional view diagram taken along a cross-sectional line C-C' in FIG. 6. The manufacturing method of the touch panel in this embodiment includes following steps. Firstly, as shown in FIG. 4 and FIG. 5, a substrate 210 is provided. A plurality of first lower conductive units 220X and a plurality of second lower conductive units 220Y are then formed on the substrate 210. A method of forming the first lower conductive units 220X and the second lower conductive units 220Y in this embodiment may preferably include forming a first conductive layer 220 on the substrate 210 and performing a patterning process on the first conductive layer 220 so as to form the first lower conductive units 220X and the second lower conductive units 220Y. In other words, the first lower conductive units 220X and the second lower conductive units 220Y are preferably made by patterning one identical conductive layer, but the present invention is not limited to this. In other preferred embodiments of the present invention, the first lower conductive units 220X and the second lower conductive units 220Y may also be formed by different conductive layers according to other design considerations.

As shown in FIG. 6 and FIG. 7, an insulating layer 230 is then formed and covers the first lower conductive units 220X, the second lower conductive units 220Y, and the substrate 210. Subsequently, a plurality of first holes V1 and a plurality of second holes V2 are formed in the insulating layer 230. Each of the first holes V1 partially exposes one of the first lower conductive units 220X, and each of the second holes V1 partially exposes one of the second lower conductive units 220Y.

As shown in FIG. 2 an FIG. 3, a plurality of first upper conductive units 240X and a plurality of second upper conductive units 240Y are then formed on the insulating layer 230. IN this embodiment, a method of forming the first upper conductive units 240X and the second upper conductive units 240Y may preferably include forming a second conductive layer 240 on the insulating layer 230, and performing a patterning process on the second conductive layer 240 so as to form the first upper conductive units 240X and the second upper conductive units 240Y. The touch panel 200 as shown in FIG. 2 and FIG. 3 may be formed after forming the first upper conductive units 240X and the second upper conductive units 240Y.

In this embodiment, the first upper conductive units 240X and the second upper conductive units 240Y are preferably made by patterning one identical conductive layer, but the present invention is not limited to this. In other preferred embodiments of the present invention, he first upper conductive units 240X and the second upper conductive units 240Y may also be formed by different conductive layers according to other design considerations. In this embodiment, the first upper conductive units 240X are electrically connected to the first lower conductive units 220X via the first holes V1, and the second upper conductive units 240Y are electrically connected to the second lower conductive units 220Y via the second holes V2. The first conductive layer 220 and the second conductive layer 240 in this embodiment may include a transparent conductive material such as indium tin oxide, indium zinc oxide, and aluminum zinc oxide, or other appropriate non-transparent conductive materials such as silver, aluminum, copper, magnesium, molybdenum, a stack layer of the above-mentioned materials, or an alloy of the above-mentioned materials, but not limited thereto. It is worth noting that the first conductive layer 220 and the second conductive layer 240 are preferably made of the same conductive material, or materials of a contact region between the first conductive layer 220 and the second conductive layer 240 may preferably be identical so as to avoid problems caused by different materials in the contact region, but not limited thereto. For instance, when the first conductive layer 220 and the second conductive layer 240 are multi-layer structures respectively, a material of a top layer in the first conductive layer 220 is preferably identical to a material of a bottom layer in the second conductive layer 240, but not limited thereto. Additionally, the first upper conductive units 240X and the first lower conductive units 220X are aligned alternately along the first direction X and electrically connected with each other so as to form a plurality of first axis electrodes 250X. The second upper conductive units 240Y and the second lower conductive units 220Y are aligned alternately along the second direction Y and electrically connected with each other so as to form a plurality of second axis electrodes 250Y. Allocations and material properties of the components in the touch panel 200 have been detailed above and will not be redundantly described.

Figure 8:
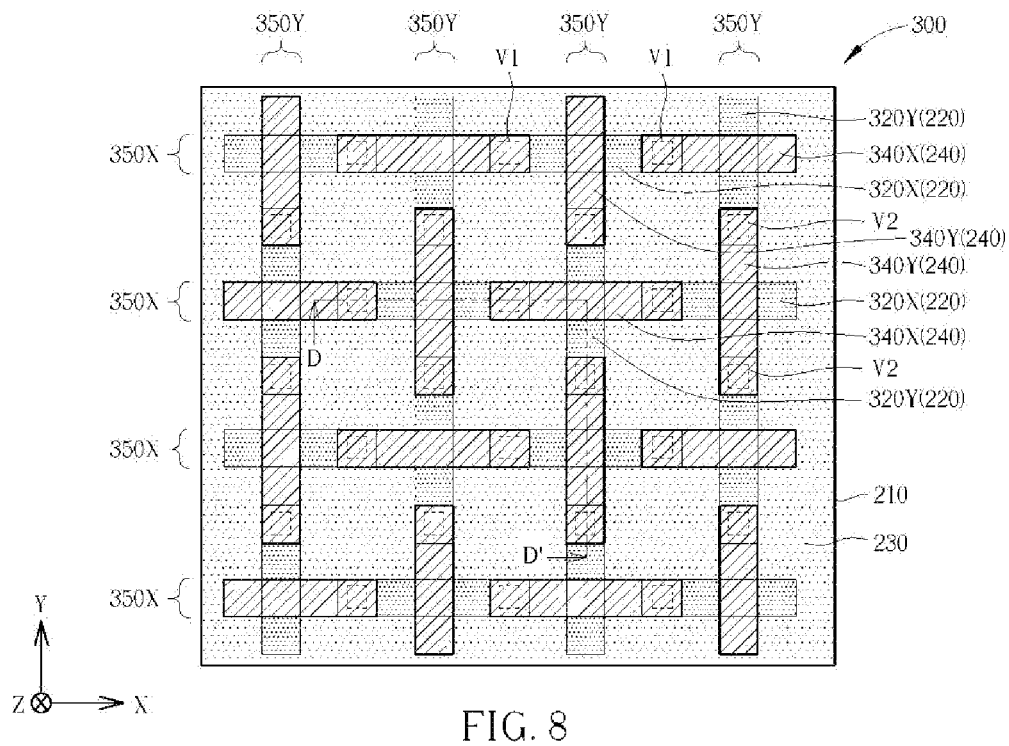
FIG. 8 is a schematic diagram illustrating a touch panel according to a second preferred embodiment of the present invention.
Figure 9:
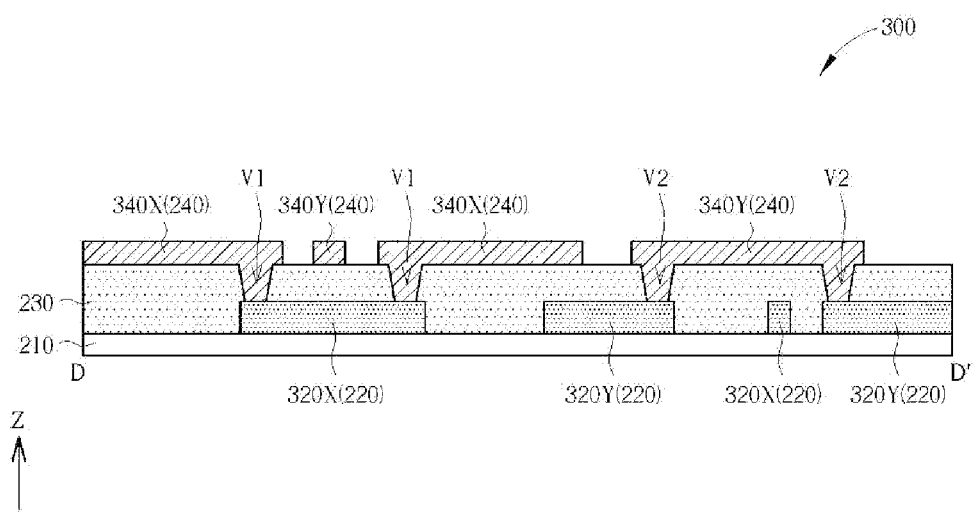
FIG. 9 is a cross-sectional view diagram taken along a cross-sectional line D-D' in FIG. 8.

Please refer to FIG. 8 and FIG. 9. FIG. 8 is a schematic diagram illustrating a touch panel according to a second preferred embodiment of the present invention. FIG. 9 is a cross-sectional view diagram taken along a cross-sectional line D-D' in FIG. 8. As shown in FIG. 8 and FIG. 9, a touch panel 300 is provided in this embodiment. The touch panel 300 includes a substrate 210, an insulating layer 230, a plurality of first axis electrodes 350X, and a plurality of second axis electrodes 350Y. The first axis electrodes 350X extend along the first direction X, and the second axis electrodes 350Y extend along the second direction Y. The first axis electrodes 350X are electrically isolated from the second axis electrodes 350Y. Each of the first axis electrodes 350X includes a plurality of first upper conductive units 340X and a plurality of first lower conductive units 320X. The first upper conductive units 340X are disposed on the upper side of the insulating layer 230, and the first lower conductive units 320X are disposed on the lower side of the insulating layer 230. Each of the second axis electrodes 350Y includes a plurality of second upper conductive units 340Y and a plurality of second lower conductive units 320Y. The second upper conductive units 340Y are disposed on the upper side of the insulating layer 230, and the second lower conductive units 320Y are disposed on the lower side of the insulating layer 230. In other words, each of the first upper conductive units 340X and each of the second upper conductive units 340Y are disposed on the upper side of the insulating layer 230. Each of the first lower conductive units 320X and each of the second lower conductive units 320Y are disposed on the lower side of the insulating layer 230. Each of the first holes V1 partially exposes one of the first lower conductive units 320X, and the first upper conductive units 340X are electrically connected to the first lower conductive units 320X via the first holes V1. Each of the second holes V2 partially exposes one of the second lower conductive units 320Y, and the second upper conductive units 340Y are electrically connected to the second lower conductive units 320Y via the second holes V2. The difference between the touch panel 300 of this embodiment and the first preferred embodiment described above is that each of the first upper conductive units 340X, each of the first lower conductive units 320X, each of the second upper conductive units 340Y, and each of the second lower conductive units 320Y are preferably a stripe conductive unit respectively, but the present invention is not limited to this. In other preferred embodiments of the present invention, each of the first upper conductive units 340X, each of the first lower conductive units 320X, each of the second upper conductive units 340Y, and each of the second lower conductive units 320Y may also be designed in other shapes such as triangles, polygons, or irregular shapes so as to generate other required effects.

A manufacturing method of the touch panel 300 in this embodiment is similar to the manufacturing method of the first preferred embodiment. In this embodiment, a method of forming the first lower conductive units 320X and the second lower conductive units 320Y may preferably include forming a first conductive layer 220 on the substrate 210 and performing a patterning process on the first conductive layer 220 so as to form the first lower conductive units 320X and the second lower conductive units 320Y. In other words, the first lower conductive units 320X and the second lower conductive units 320Y are preferably made by patterning one identical conductive layer, but not limited thereto. In addition, a method of forming the first upper conductive units 340X and the second upper conductive units 340Y may preferably include forming a second conductive layer 340 on the insulating layer 230, and performing a patterning process on the second conductive layer 340 so as to form the first upper conductive units 340X and the second upper conductive units 340Y. In other words, the first upper conductive units 340X and the second upper conductive units 340Y are preferably made by patterning one identical conductive layer, but the present invention is not limited to this. Apart from the shapes of each of the first upper conductive units 340X, each of the first lower conductive units 320X, each of the second upper conductive units 340Y, and each of the second lower conductive units 320Y in this embodiment, the other components, allocations, material properties, and the manufacturing method in this embodiment are similar to those of the first preferred embodiment detailed above and will not be redundantly described.

To summarize the above descriptions, in the touch panel of the present invention, the conductive units are disposed on the upper side and the lower side of the insulating layer. The conductive units disposed on different sides are electrically connected with each other via the holes formed in the insulating layer. Different axis electrodes extending in different directions and electrically isolated from each other may be formed accordingly. Since the conventional bridge design is not required in the touch panel of the present invention, related yield problems caused by the bridge design may be prevented, and the product quality and the reliability may be enhanced accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch panel, comprising:
   an insulating layer, having a plurality of first holes and a plurality of second holes;
   a first axis electrode, extending along a first direction, the first axis electrode comprising:
      a plurality of first upper conductive units, disposed on an upper side of the insulating layer; and a plurality of first lower conductive units, disposed on a lower side of the insulating layer, wherein each of the first holes partially exposes one of the first lower conductive units, each of the first lower conductive units partially exposed from one of the first holes, and wherein each of the first upper conductive units is electrically connected to one of the first lower conductive units via one of the first holes, each of the first lower conductive units electrically connected to one of the first upper conductive units via one of the first holes; and a second axis electrode, extending along a second direction, the second axis electrode comprising:
a plurality of second upper conductive units, disposed on the upper side of the insulating layer; and
a plurality of second lower conductive units, disposed on the lower side of the insulating layer, wherein each of the second holes partially exposes one of the second lower conductive units, the second upper conductive units are electrically connected to the second lower conductive units via the second holes, and the second axis electrode is electrically isolated from the first axis electrode.

2. The touch panel of claim 1, wherein the first direction is perpendicular to the second direction.

3. The touch panel of claim 1, wherein the first upper conductive units and the first lower conductive units are disposed alternately on the upper side and the lower side of the insulating layer along the first direction, and the second upper conductive units and the second lower conductive units are disposed alternately on the upper side and the lower side of the insulating layer along the second direction.

4. The touch panel of claim 1, wherein the first lower conductive units are electrically isolated from the second lower conductive units, and the first upper conductive units are electrically isolated from the second upper conductive units.

5. The touch panel of claim 1, further comprising a substrate, disposed on the lower side of the insulating layer, wherein the first lower conductive units and the second lower conductive units are disposed between the insulating layer and the substrate.

6. The touch panel of claim 1, wherein each of the first upper conductive units comprises a first upper main part and a first upper protrudent part, each of the first lower conductive units comprises a first lower main part and a first lower protrudent part, the first upper protrudent part extends from the first upper main part along the first direction, and the first lower protrudent part extends from the first lower main part along the first direction, wherein each of the first upper protrudent parts is electrically connected to one of the first lower main parts via one of the first holes, and each of the first lower protrudent parts is electrically connected to one of the first upper main parts via one of the first holes.

7. The touch panel of claim 6, wherein each of the second upper conductive units comprises a second upper main part and a second upper protrudent part, each of the second lower conductive units comprises a second lower main part and a second lower protrudent part, the second upper protrudent part extends from the second upper main part along the second direction, and the second lower protrudent part extends from the second lower main part along the second direction, wherein each of the second upper protrudent parts is electrically connected to one of the second lower main parts via one of the second holes, and each of the second lower protrudent parts is electrically connected to one of the second upper main parts via one of the second holes.

8. The touch panel of claim 1, wherein each of the first upper conductive units, each of the first lower conductive units, each of the second upper conductive units, and each of the second lower conductive units respectively comprises a stripe conductive unit.

9. A manufacturing method of a touch panel, comprising:
forming a plurality of first lower conductive units and a plurality of second lower conductive units on a substrate;
forming an insulating layer, covering the first lower conductive units and the second lower conductive units;
forming a plurality of first holes and a plurality of second holes in the insulating layer, wherein each of the first holes partially exposes one of the first lower conductive units, and each of the second holes partially exposes one of the second lower conductive units; and
forming a plurality of first upper conductive units and a plurality of second upper conductive units on the insulating layer, wherein the first upper conductive units are electrically connected to the first lower conductive units via the first holes, each of the first lower conductive units partially exposed from one of the first holes, and wherein each of the second upper conductive units is electrically connected to one of the second lower conductive units via one of the second holes, each of the first lower conductive units electrically connected to one of the first upper conductive units via one of the first holes.

10. The manufacturing method of claim 9, wherein a method of forming the first lower conductive units and the second lower conductive units comprises: forming a first conductive layer on the substrate; and performing a patterning process on the first conductive layer so as to form the first lower conductive units and the second lower conductive units.

11. The manufacturing method of claim 9, wherein a method of forming the first upper conductive units and the second upper conductive units comprises: forming a second conductive layer on the insulating layer; and performing a patterning process on the second conductive layer so as to form the first upper conductive units and the second upper conductive units.

12. The manufacturing method of claim 9, wherein the first upper conductive units and the first lower conductive units are aligned alternately along the first direction and electrically connected with each other, and the second upper conductive units and the second lower conductive units are aligned alternately along the second direction such that theand electrically connected with each other.

13. The manufacturing method of claim 12, wherein the first direction is perpendicular to the second direction.

14. The manufacturing method of claim 9, wherein the first lower conductive units are electrically isolated from the second lower conductive units, and the first upper conductive units are electrically isolated from the second upper conductive units.

15. The manufacturing method of claim 9, wherein each of the first upper conductive units comprises a first upper main part and a first upper protrudent part, each of the first lower conductive units comprises a first lower main part and a first lower protrudent part, the first upper protrudent part extends from the first upper main part along the first direction, and the first lower protrudent part extends from the first lower main part along the first direction, wherein each of the first upper protrudent parts is electrically connected to one of the first lower main parts via one of the first holes, and each of the first lower protrudent parts is electrically connected to one of the first upper main parts via one of the first holes.

16. The manufacturing method of claim 15, wherein each of the second upper conductive units comprises a second upper main part and a second upper protrudent part, each of the second lower conductive units comprises a second lower main part and a second lower protrudent part, the second upper protrudent part extends from the second upper main part along the second direction, and the second lower protrudent part extends from the second lower main part along the second direction, wherein each of the second upper protrudent parts is electrically connected to one of the second lower main parts via one of the second holes, and each of the second lower protrudent parts is electrically connected to one of the second upper main parts via one of the second holes.

17. The manufacturing method of claim 9, wherein each of the first upper conductive units, each of the first lower conductive units, each of the second upper conductive units, and each of the second lower conductive units respectively comprise a stripe conductive unit.

18. The touch panel of claim 1, wherein one of the first upper conductive units is electrically connected to two adjacent first lower conductive units via two of the first holes, and of the first lower conductive units electrically connected to two adjacent first upper conductive units via two of the first holes.

19. The touch panel of claim 1, wherein each of the second holes partially exposes one of the second lower conductive units, each of the second lower conductive units partially exposed from one of the second holes, and wherein each of the second upper conductive units is electrically connected to one of the second lower conductive units via one of the second holes, each of the second lower conductive units electrically connected to one of the second upper conductive units via one of the second holes.

20. The manufacturing method of claim 9, wherein one of the first upper conductive units is electrically connected to two adjacent first lower conductive units via two of the first holes, and of the first lower conductive units electrically connected to two adjacent first upper conductive units via two of the first holes.

\* \* \* \* \*